(12) United States Patent
Hu et al.

(10) Patent No.: US 10,502,974 B2
(45) Date of Patent: *Dec. 10, 2019

(54) DUAL-LENS CAMERA SYSTEM

(71) Applicant: TDK TAIWAN CORP., Taoyuan (TW)

(72) Inventors: Chao-Chang Hu, Taoyuan (TW);
Bing-Ru Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,085

(22) Filed: Dec. 28, 2018

(65) Prior Publication Data

US 2019/0137781 A1    May 9, 2019

Related U.S. Application Data

(63) Continuation of application No. 15/966,315, filed on Apr. 30, 2018, now Pat. No. 10,203,516, which is a
(Continued)

(30) Foreign Application Priority Data

Apr. 11, 2017   (TW) .............................. 106111993 A

(51) Int. Cl.
  *G02B 27/64* (2006.01)
  *G02B 7/00* (2006.01)
(Continued)

(52) U.S. Cl.
  CPC ........... *G02B 27/646* (2013.01); *G02B 7/001* (2013.01); *G02B 7/09* (2013.01); *G03B 5/00* (2013.01);
(Continued)

(58) Field of Classification Search
  CPC .............. G02B 5/00; G02B 2205/0007; G02B 27/646; H04N 5/23248; H04N 5/2328; H04N 5/2252
(Continued)

(56) References Cited

U.S. PATENT DOCUMENTS

| 4,772,903 A | 9/1988 | Labaziewicz |
| 4,801,958 A | 1/1989 | Stoneham |

(Continued)

FOREIGN PATENT DOCUMENTS

| CN | 203933331 U | 11/2014 |
| CN | 104716458 A | 6/2015 |

(Continued)

*Primary Examiner* — William R Alexander
*Assistant Examiner* — Tamara Y. Washington
(74) *Attorney, Agent, or Firm* — Muncy, Geissler, Olds & Lowe, P.C.

(57) ABSTRACT

A dual-lens camera system is provided, including a first lens driving module and a second lens driving module each including a lens holder for receiving a lens, at least one magnetic element, and a driving board. The driving board has at least one driving coil for acting with the magnetic element to generate an electromagnetic force to move the lens holder along a direction that is perpendicular to the optical axis of the lens. On two adjacent sides parallel to each other of the first and second lens driving modules, the magnetic elements are arranged in different configurations.

20 Claims, 15 Drawing Sheets

Related U.S. Application Data continuation of application No. 15/499,387, filed on Apr. 27, 2017, now Pat. No. 9,995,945.

(60) Provisional application No. 62/328,790, filed on Apr. 28, 2016.

(51) Int. Cl.
*G03B 5/00* (2006.01)
*G02B 7/09* (2006.01)
*H04N 5/232* (2006.01)
*G03B 5/02* (2006.01)
*G03B 29/00* (2006.01)
*G03B 37/00* (2006.01)

(52) U.S. Cl.
CPC .............. *G03B 5/02* (2013.01); *G03B 29/00* (2013.01); *G03B 37/00* (2013.01); *G03B 2205/0015* (2013.01); *H04N 5/23248* (2013.01); *H04N 5/23287* (2013.01)

(58) Field of Classification Search
USPC .................................. 359/554–557
See application file for complete search history.

(56) References Cited

U.S. PATENT DOCUMENTS

| | | |
|---|---|---|
| 5,852,753 A | 12/1998 | Lo |
| 6,282,377 B1 | 8/2001 | Lawther et al. |
| 7,725,014 B2 | 5/2010 | Lam et al. |
| 8,947,545 B2 | 2/2015 | Han et al. |
| 9,491,364 B2 | 11/2016 | Shin |
| 9,654,694 B2 | 5/2017 | Scarff et al. |
| 9,772,506 B2 | 9/2017 | Hu et al. |
| 9,781,325 B1 | 10/2017 | Wang et al. |
| 9,866,817 B2 | 1/2018 | Hsu et al. |
| 9,885,880 B2 | 2/2018 | Hu et al. |
| 9,904,070 B2 | 2/2018 | Hu et al. |
| 9,904,072 B2 | 2/2018 | Fan |
| 9,958,756 B2 | 5/2018 | Hu et al. |
| 9,995,945 B2 | 6/2018 | Hu |
| 10,019,031 B2 | 7/2018 | Hu |
| 2010/0097707 A1 | 4/2010 | Seo |
| 2012/0082442 A1 | 4/2012 | Kwon et al. |
| 2013/0148995 A1 | 6/2013 | Yoshikawa |
| 2013/0265394 A1 | 10/2013 | Lim et al. |
| 2014/0368914 A1 | 12/2014 | Hu et al. |
| 2014/0376090 A1 | 12/2014 | Terajima |
| 2015/0160470 A1 | 6/2015 | Terajima |
| 2015/0362696 A1 | 12/2015 | Han et al. |
| 2016/0209621 A1 | 7/2016 | Park et al. |
| 2016/0274375 A1 | 9/2016 | Park et al. |
| 2017/0150061 A1 | 5/2017 | Shabtay et al. |
| 2017/0244874 A1 | 8/2017 | Wang et al. |
| 2017/0245370 A1 | 8/2017 | Wang et al. |
| 2017/0264804 A1 | 9/2017 | Wang et al. |
| 2018/0003920 A1 | 1/2018 | Hu et al. |
| 2018/0059356 A1 | 3/2018 | Wu et al. |
| 2018/0100984 A1 | 4/2018 | Wu et al. |
| 2018/0157059 A1 | 6/2018 | Ma et al. |
| 2018/0210317 A1 | 7/2018 | Hu et al. |
| 2018/0224628 A1 | 8/2018 | Hu |

FOREIGN PATENT DOCUMENTS

| | | |
|---|---|---|
| CN | 105024516 A | 11/2015 |
| TW | 201205143 A | 2/2012 |
| TW | 201514600 A | 4/2015 |
| TW | M516172 U | 1/2016 |
| TW | M520206 U | 4/2016 |

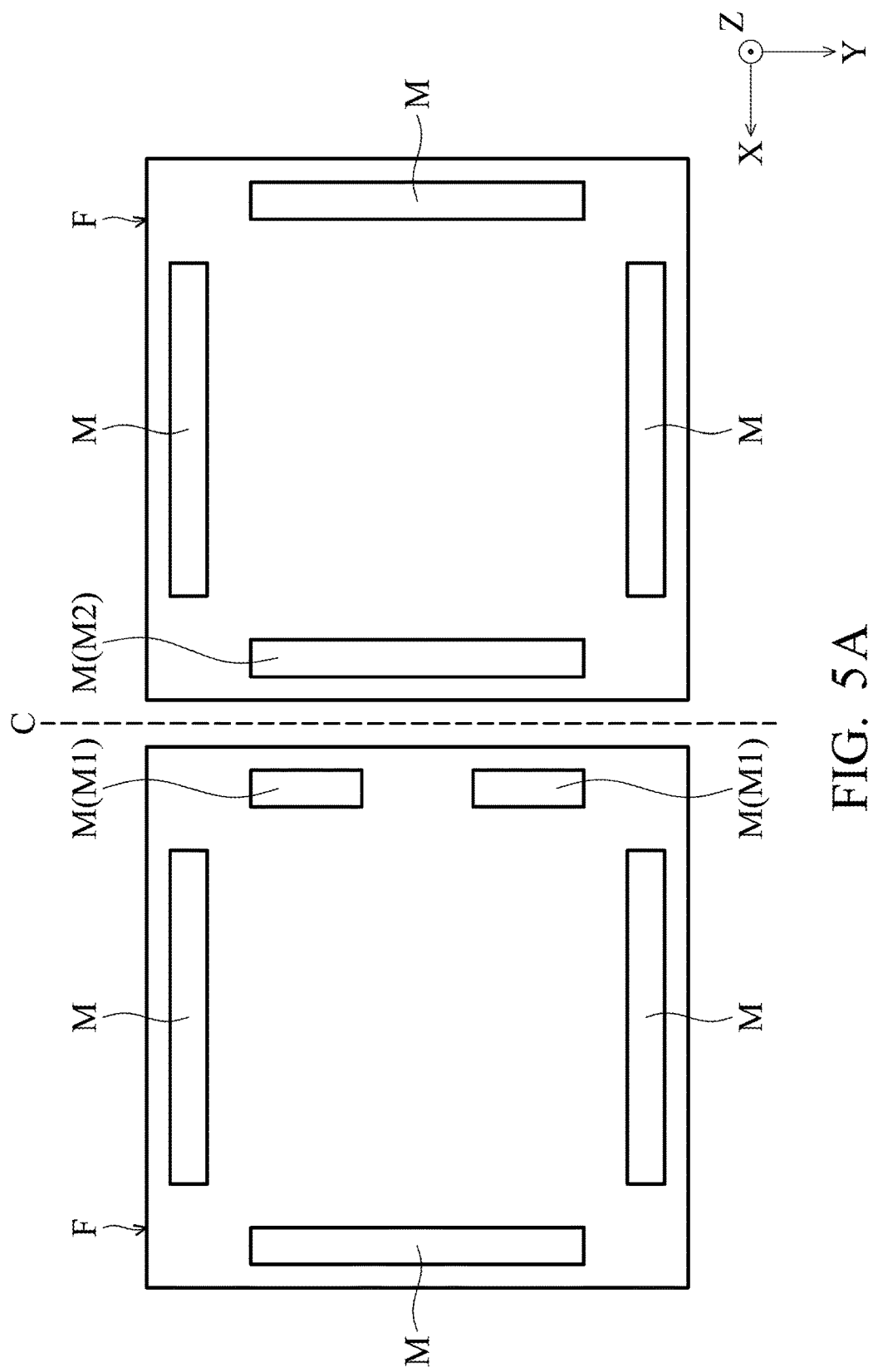

DUAL-LENS CAMERA SYSTEM

CROSS REFERENCE TO RELATED APPLICATIONS

This application is a Continuation of U.S. patent application Ser. No. 15/966,315, filed on Apr. 30, 2018, which is a Continuation of U.S. patent application Ser. No. 15/499,387, filed on Apr. 27, 2017, which claims the benefit of U.S. Provisional Application No. 62/328,790, filed on Apr. 28, 2016, and Taiwan Patent Application No. 106111993, filed on Apr. 11, 2017, the entirety of which are incorporated by reference herein.

BACKGROUND OF THE INVENTION

Field of the Invention

The invention relates to a dual-lens camera system, and more particularly to a dual-lens camera system that can move lenses using electromagnetic force.

Description of the Related Art

In existing dual-lens camera systems, two lens driving modules are usually arranged close to each other, and as a result, magnetic interference between the magnets of the two lens driving modules is likely to occur, causing the focus speed and accuracy of the lenses (which can move with the movement of the movable parts in the lens driving modules) to be adversely affected. Therefore, what is needed is a dual-lens camera system that can prevent the magnetic interference between the two lens driving modules.

BRIEF SUMMARY OF THE INVENTION

In view of the aforementioned problems, an object of the invention is to provide a dual-lens camera system that can reduce the magnetic interference generated by the magnetic elements of the two lens driving modules, thereby improving the focus speed and accuracy of the lenses in the dual-lens camera system.

An embodiment of the invention provides a dual-lens camera system, including a first lens driving module and a second lens driving module arranged in a long-axis direction. The first and second lens driving modules each include a lens holder, at least one magnetic element, and a driving board. The lens holder is configured to receive a lens. The driving board has at least one first driving coil which is configured to act with the magnetic element to generate an electromagnetic force to move the lens holder along a direction that is perpendicular to the optical axis of the lens. On two adjacent sides parallel to each other of the first and second lens driving modules, the magnetic elements are arranged in different configurations.

In some embodiments, on the two adjacent sides parallel to each other of the first and second lens driving modules, the magnetic elements are arranged asymmetrically with respect to the central line between the two adjacent sides.

In some embodiments, on the two adjacent sides parallel to each other of the first and second lens driving modules, the magnetic elements do not overlap when viewed along the long axis direction.

In some embodiments, the magnetic element of the first lens driving module has a strip or triangular structure.

In some embodiments, the first lens driving module further includes four magnetic elements respectively disposed at four corners of the first lens driving module.

In some embodiments, the magnetic elements include at least one multipole magnet.

In some embodiments, the magnetic element is not disposed on a first side of the first lens driving module adjacent to the second lens driving module.

In some embodiments, the first lens driving module further includes a magnet disposed on a second side opposite the first side. The width of the magnet is greater than the width of the magnetic element of the first lens driving module.

In some embodiments, the first lens driving module further includes a weight balancer disposed on the first side and corresponding to the magnet for maintaining the weight balance of the first lens driving module.

In some embodiments, the magnetic pole direction of the magnetic element of the first lens driving module is parallel to the optical axis of the lens.

In some embodiments, the first lens driving module further includes a magnet and a magnetic field sensing element. The magnet and the magnetic field sensing element are disposed on a first side of the first lens driving module adjacent to the second lens driving module. The magnetic field sensing element learns the position offset amount of the magnet by detecting the magnetic field variation of the magnet. The magnet and the magnetic field sensing element do not overlap when viewed along the optical axis.

In some embodiments, the first lens driving module further includes two magnetic field sensing elements. The magnet and the magnetic field sensing elements are disposed on the first side, and the magnet is located between the magnetic field sensing elements.

In some embodiments, the dual-lens camera system further includes a shielding member. The shielding member includes a magnetic conductive material and covers at least one side of the magnetic element of the first lens driving module for reducing the magnetic interference between the first and second lens driving modules.

In some embodiments, the shielding member further forms at least one recess corresponding to the top surface of the lens holder of the first lens driving module for preventing the lens holder from impacting the shielding member.

In some embodiments, on the two adjacent sides parallel to each other of the first and second lens driving modules, the magnetic elements have different lengths.

In some embodiments, on the two adjacent sides parallel to each other of the first and second lens driving modules, the number of the magnetic elements is different.

In some embodiments, on the two adjacent sides parallel to each other of the first and second lens driving modules, the magnetic elements have the same length.

In some embodiments, on the two adjacent sides parallel to each other of the first and second lens driving modules, the number of the magnetic elements is the same.

In some embodiments, the first and second lens driving modules each further include a frame. The lens holder is disposed in the frame which has the magnetic element mounted thereon. The electromagnetic force generated between the first driving coil and the magnetic element drives the frame and the lens holder therein along the direction that is perpendicular to the optical axis of the lens.

In some embodiments, the first and second lens driving modules each further include a second driving coil disposed on the lens holder. The second driving coil is configured to can act with the magnetic element to generate an electromagnetic force to move the lens holder along the optical axis with respect to the frame.

In order to illustrate the purposes, features, and advantages of the invention, the preferred embodiments and drawings of the invention are shown in detail as follows.

BRIEF DESCRIPTION OF THE DRAWINGS

The invention can be more fully understood by reading the subsequent detailed description and examples with references made to the accompanying drawings, wherein:

FIG. 5A is a schematic plane view showing the configuration of the magnetic elements of two lens driving modules in accordance with another embodiment of the invention;

DETAILED DESCRIPTION OF THE INVENTION

The making and using of the embodiments of a dual-lens camera system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
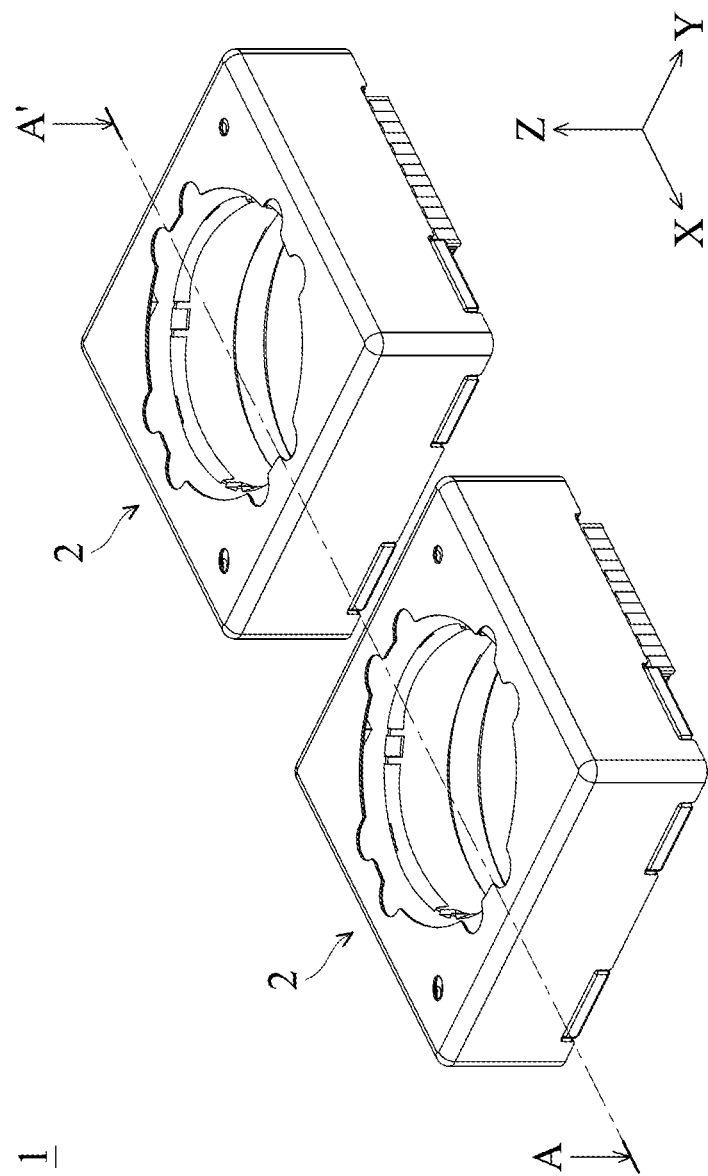
FIG. 1 is a schematic view of a dual-lens camera system in accordance with an embodiment of the invention.
Figure 2:
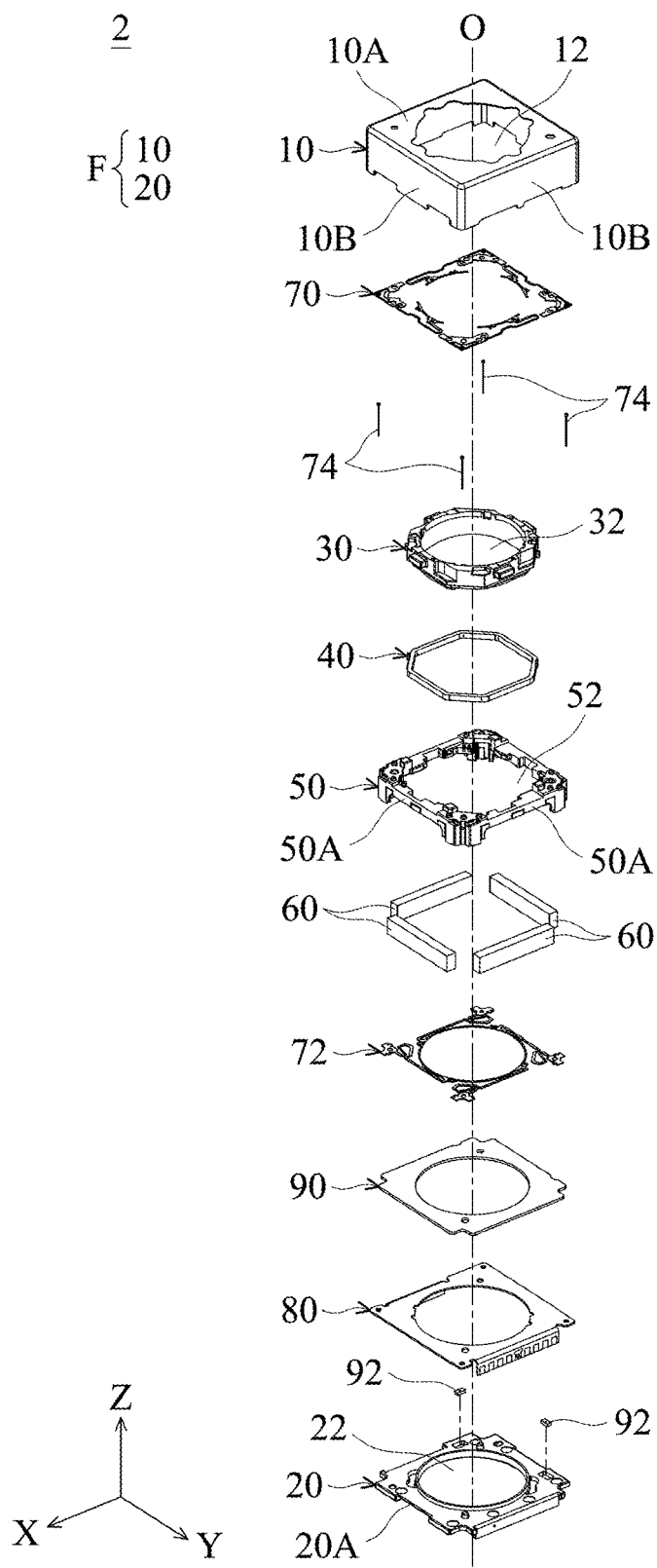
FIG. 2 is an exploded view of a lens driving module in FIG. 1.
Figure 3:
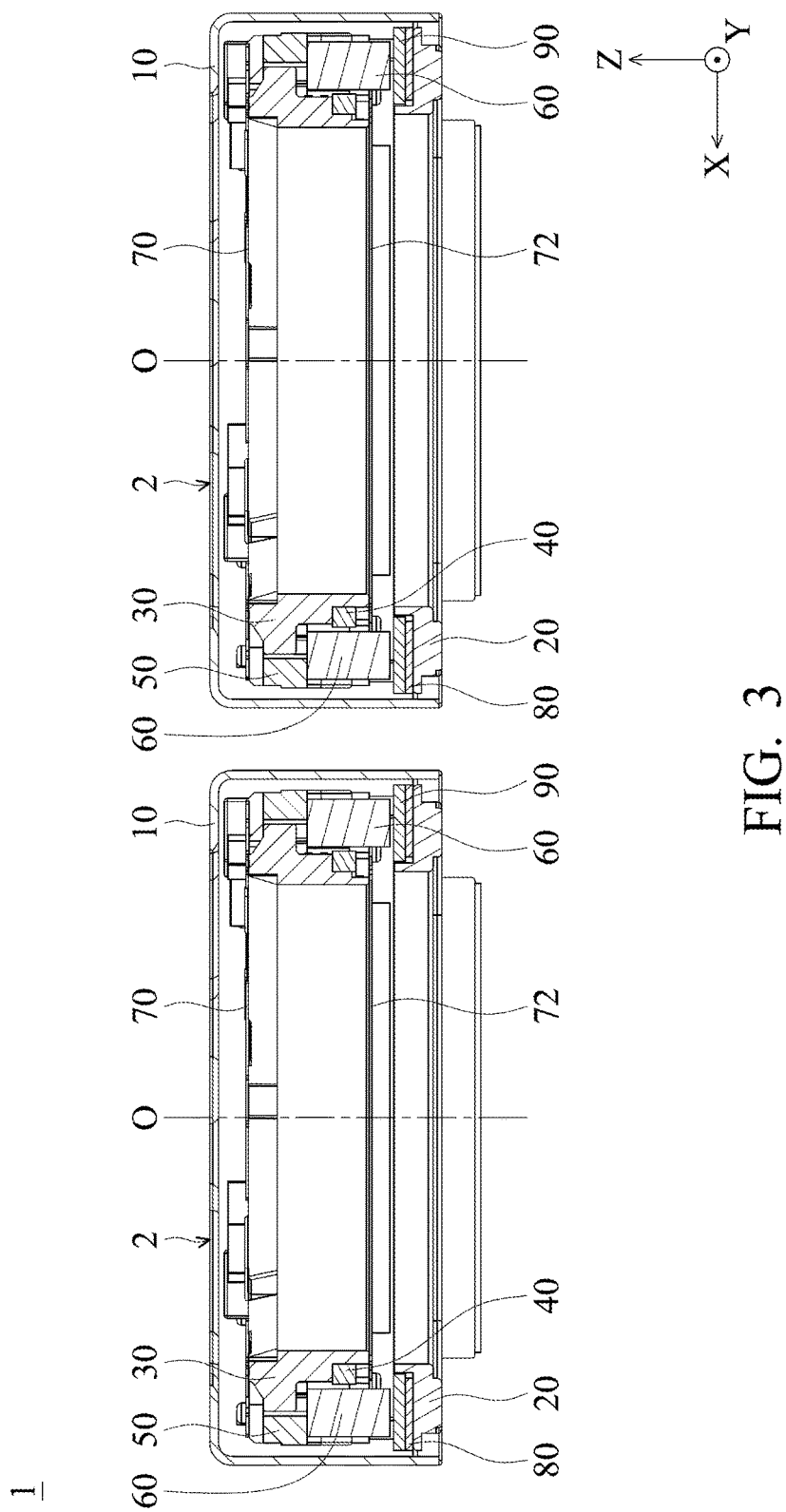
FIG. 3 is a cross-sectional view take along the line A-A' in FIG. 1.

Referring to FIGS. 1 to 3, wherein FIG. 1 is a schematic view of a dual-lens camera system 1 in accordance with an embodiment of the invention, FIG. 2 is an exploded view of a lens driving module 2 in FIG. 1, and FIG. 3 is a cross-sectional view take along the line A-A' in FIG. 1. In this embodiment, two lens driving modules 2 of the dual-lens camera system 1 may be provided in handheld digital products such as mobile phones or tablet PCs and arranged side-by-side in a long-axis direction (the X-axis direction). The two lens driving modules 2 are, for example, voice coil motors (VCM) having the same specification and equipped with an optical image stabilizer (OIS) function, but the invention is not limited thereto. In some embodiments, the two lens driving modules 2 of the dual-lens camera system 1 may also have different specifications and be equipped with auto-focus (AF) and OIS functions.

As shown in FIGS. 1 to 3, each lens driving module 2 in this embodiment includes a top casing 10, a base 20, a lens holder 30, a driving coil 40, a frame 50, four driving magnets 60 (magnetic elements), an upper spring 70, a lower spring 72, four suspension wires 74, a circuit board 80, a driving board 90, and two magnetic field sensing elements 92.

The top casing 10 has a hollow structure. Also, the top casing 10 can be combined with the base 20 to form a housing F of the lens driving module 2, wherein the top casing 10 constitutes a top wall 10A and four sidewalls 10B of the housing F, and the base 20 constitutes a bottom wall 20A of the housing F. In addition, a top casing opening 12 and a base opening 22 are respectively formed on the top casing 10 and the base 20. The center of the top casing opening 12 is located on an optical axis O (parallel to the Z-axis) of a lens (not shown). The base opening 22 is also located on the optical axis O and faces an image sensor (not shown) placed outside the lens driving module 2. Accordingly, the lens in the lens driving module 2 and the image sensor can perform image focusing in the direction of the optical axis O.

The frame 50 has an opening 52 and four frame edges 50A respectively corresponding to the four sidewalls 10B of the housing F. In this embodiment, the four driving magnets 60 are affixed to the four frame edges 50A. In some embodiments, the four driving magnets 60 may also be affixed to four corners of the frame 50. The shape of the driving magnets 60 may be a long strip or a triangle.

The lens holder 30 has a hollow ring structure and a through hole 32. The through hole 32 forms a threaded structure (not shown) corresponding to another threaded structure on the outer peripheral surface of the lens, such that the lens can be locked in the through hole 32. The driving coil 40 (second driving coil) is wound around the outer peripheral surface of the lens holder 30.

In this embodiment, the lens holder 30 and the lens therein are movably disposed in the frame 50. More specifically, the lens holder 30 is suspended in the center of the frame 50 by the upper spring 70 and the lower spring 72 made of a metal material. When a current is supplied to the driving coil 40, the driving coil 40 can act with the magnetic field of the driving magnets 60 to generate an electromagnetic force to move the lens holder 30 and the lens therein along the Z-axis (i.e. the optical axis O) direction with respect to the frame 50. For example, the four driving magnets 60 (magnetic elements) may comprise at least one multipole magnet which is used to electromagnetically act with the driving coil 40 to move the lens holder 30 and the lens along the optical axis O so as to perform image focusing.

Moreover, the outer peripheral portions of the upper and lower springs 70 (elastic element) and 72 (elastic element) are respectively connected to the upper and lower sides of the frame 50, and the inner peripheral portions of the upper and lower springs 70 and 72 are respectively connected to the upper and lower sides of the lens holder 30, so that the lens holder 30 can be elastically suspended in the frame 50 (i.e. the lens holder 30 is movably connected to the frame 50).

The circuit board 80, such as a flexible printed circuit board (FPC), is affixed to the base 20 by adhesion, for example. In this embodiment, the circuit board 80 is electrically connected to a driving unit (not shown) placed outside the lens driving module 2 to perform OIS and other functions (such as AF function).

One end of the four suspension wires 74 is affixed to the circuit board 80 and the other end is connected to the upper spring 70, so that the suspension wire 74 can suspend the frame 50 and the lens holder 30 therein in the housing F and on the base 20 (i.e. the frame 50 is movably connected to the base 20). The suspension wires 74 may comprise a metal material.

The driving board 90m such as a printed circuit board, has four first driving coils (not shown) therein. The positions of the four first driving coils respectively correspond to the positions of the four driving magnets 60 (wherein the two first driving coils are parallel to the X-axis direction and the other two first driving coils are parallel to the Y-axis direction). The driving board 90 is affixed to the circuit board 80 by adhesion, for example.

It should be realized that the circuit board 80 is provided with wiring (not shown) for transmitting electrical signals to the driving coil 40 and the first driving coils of the driving board 90. In some embodiments, the wiring on the circuit board 80 may be electrically connected to the driving coil 40 through the suspension wires 74 and the upper spring 70, thereby controlling the movement of the lens holder 30 along the optical axis O.

In this embodiment, two magnetic field sensing elements 92 are respectively mounted on two sides of the base 20 extending in the X-axis and Y-axis directions. The two magnetic field sensing elements 92 may be Hall effect sensors, MR sensors, or Fluxgate sensors, and can be used to learn the position offset amount of the frame 50 and the lens holder 30 with respect to the base 20 in the X-axis and Y-axis directions by detecting the magnetic field variation of the (reference) magnetic elements 60 on the frame 50 (that is, the magnetic field sensing element 92 and the corresponding reference magnetic element on the frame 50 form a position sensing assembly).

Furthermore, the circuit board 80 can generate electrical signals to be transmitted to the first driving coils of the driving board 90, and the first driving coils can act with the driving magnets 60 on the frame 50 to generate an electromagnetic force to move the frame 50 and the lens holder 30 therein along a direction that is perpendicular to the optical axis O (parallel to the XY plane) to compensate for the position offset described above. As a result, the OIS function is achieved.

As shown in FIG. 3, since the position of the two lens driving modules 2 in the dual-lens camera system 1 is very close, magnetic interference between the two adjacent driving magnets 60 of the two lens driving modules 2 is likely to occur, causing the focus speed and accuracy of the lenses to be adversely affected.

Figure 4:
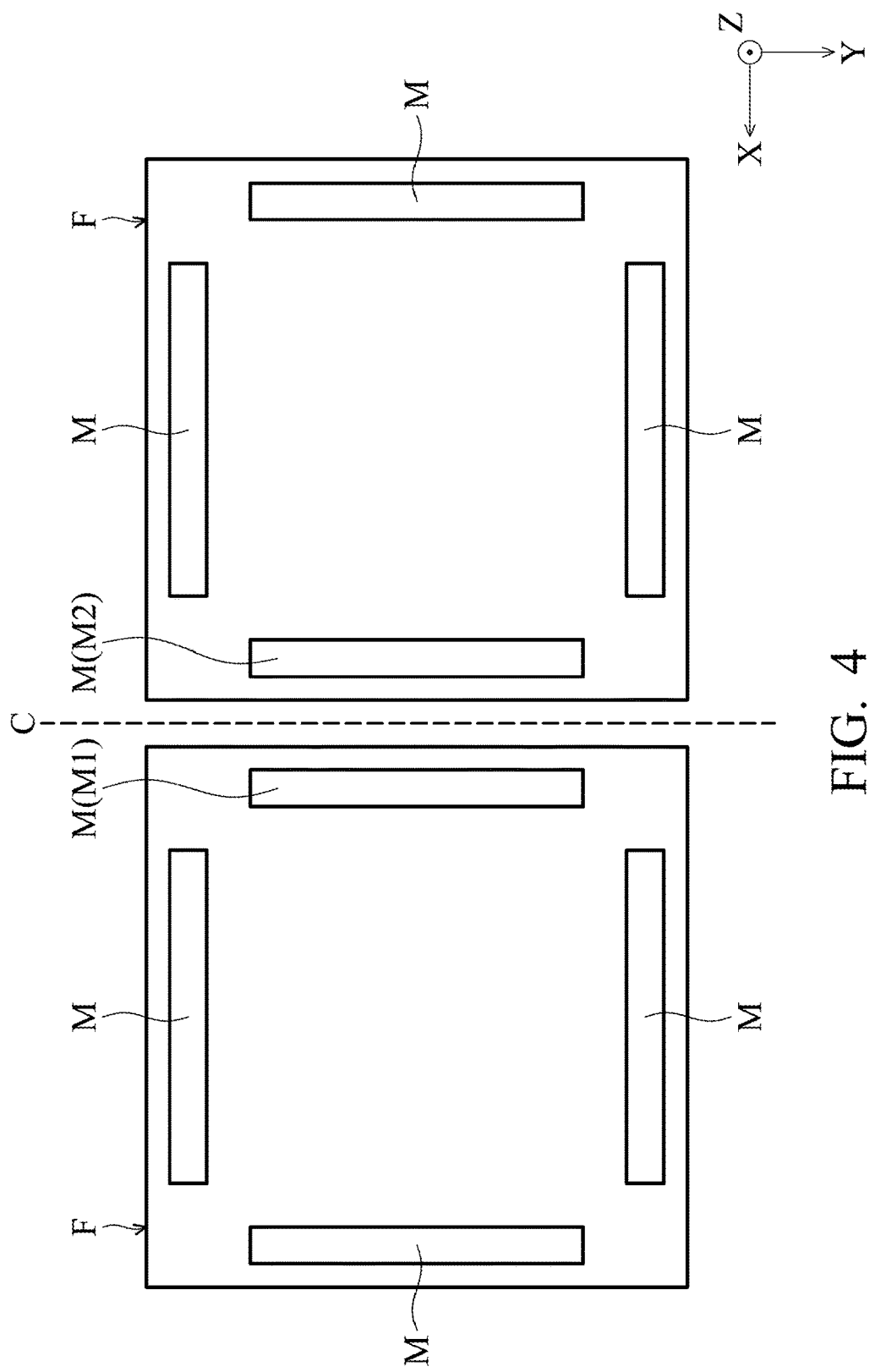
FIG. 4 is a schematic plane view showing the configuration of the magnetic elements of a dual-lens camera system in accordance with an embodiment of the invention.

FIG. 4 is a schematic plane view (when viewed along a direction of the optical axis of the lens) showing the configuration of the magnetic elements of a dual-lens camera system in accordance with an embodiment of the invention. For the sake of simplicity and clarity, this embodiment and the following embodiments illustrate only the housings F and magnetic elements M of the two lens driving modules to show their relative positions. As shown in FIG. 4, the magnetic elements M (corresponding to the driving magnets 60 in FIGS. 2 and 3) in the dual-lens camera system have the same structure (for example, all are long strip magnets). Moreover, the two adjacent magnetic elements M1 and M2 disposed in the two different housings F are arranged to be symmetrical with respect to a central line C between the two housings F. However, in order to reduce the magnetic interference between the magnetic elements M1 and M2 which are close to each other, the magnetic elements M1 and M2 may be multipole magnets to overcome this problem, thereby ensuring the focus speed and accuracy of the lenses of the dual-lens camera system.

In addition, in the following embodiments, the adjacent magnetic elements M1 and M2 corresponding to the two adjacent sides parallel to each other of the two housings F (two rectangular lens driving modules) may also be arranged in different configurations so as to reduce the magnetic interference generated by the adjacent magnetic elements M1 and M2 of the two lens driving modules, thereby reducing the magnetic interference between the two lens driving modules of the dual-lens camera system.

FIG. 5A is a schematic plane view showing the configuration of the magnetic elements of two lens driving modules in accordance with another embodiment of the invention. In this embodiment, the magnetic elements M (including a magnetic element M2) of a second lens driving module on the right side of FIG. 5A all have the same structure (long strip magnets), and the magnetic elements M (including a magnetic element M1) of a first lens driving module on the left side of FIG. 5A have different structural configuration. For example, the magnetic element M1 of the first lens driving module includes at least two short magnets (i.e. their length is less than the length of the other magnetic elements M) spaced from each other, as shown in FIG. 5A. Accordingly, on two adjacent sides of the first and second lens driving modules, the magnetic elements M1 and M2 are arranged asymmetrically with respect to a central line C between the two adjacent sides.

Figure 5B:
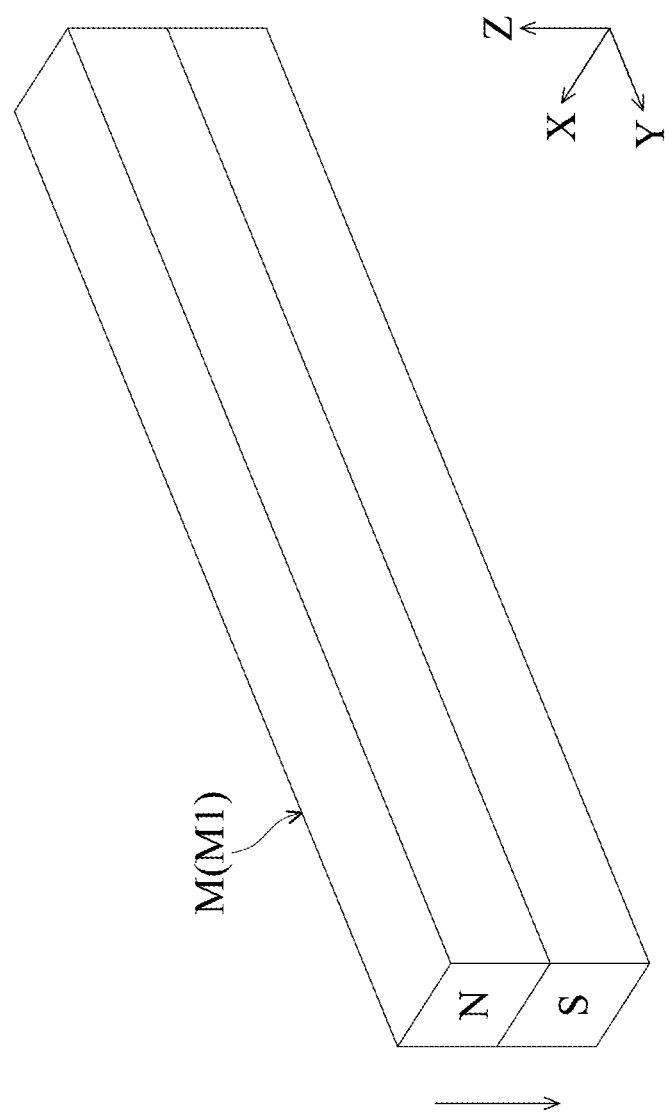
FIG. 5B is a schematic view showing the magnetic pole direction (N-S) of the magnetic element M1 in FIG. 5A.

With the above structural design shown in FIG. 5A, the magnetic interference generated by the adjacent magnetic elements M1 and M2 of the two lens driving modules can be reduced. Consequently, the magnetic interference between the two lens driving modules of the dual-lens camera system is reduced. It should also be realized that, by providing the magnetic field sensing elements 92 (see FIG. 2) on the base 20 to respectively detect the magnetic field variation of the two (reference) magnetic elements M1 (i.e. the reference magnetic element N1 and the magnetic field sensing element 92 form a position sensing assembly), the position offset amount of the frame 50 with respect to the base 20 in the X-axis and Y-axis directions can be known. In addition, as indicated by the arrow direction in FIG. 5B, since the magnetic pole direction (N-S) of the magnetic element M1 is parallel to the optical axis O (Z-axis direction) of the lens in this embodiment, the magnetic interference generated by the magnetic element M1 and the magnetic element M2 of the second lens driving module can be reduced. Also, since the two magnetic elements M1 are separated by a distance and offset from the center position of the magnetic element M2, the magnetic interference between the magnetic elements M1 and M2 can be reduced further.

Figure 6:
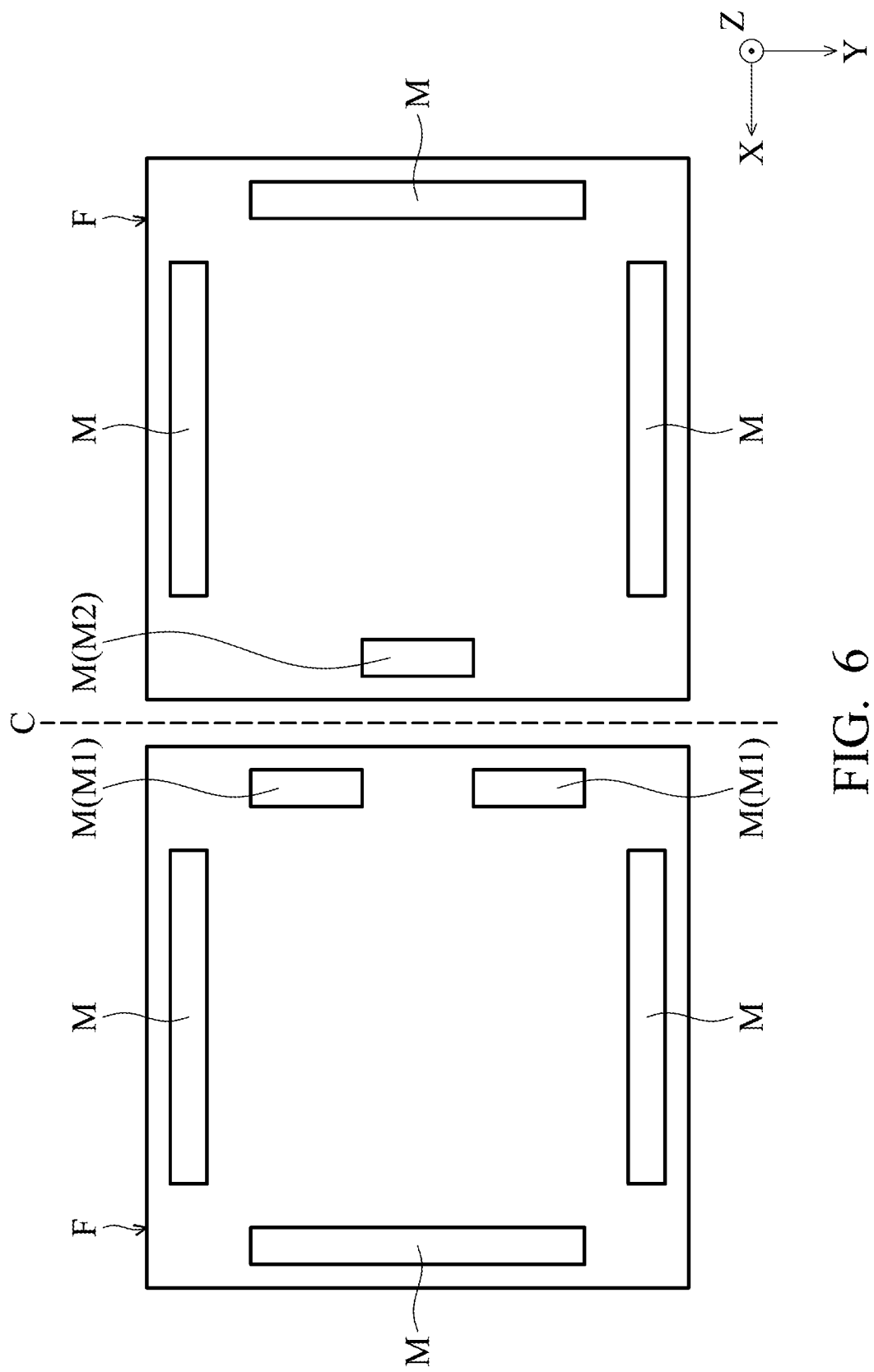
FIG. 6 is a schematic plane view showing the configuration of the magnetic elements of two lens driving modules in accordance with another embodiment of the invention.

FIG. 6 is a schematic plane view showing the configuration of the magnetic elements of two lens driving modules in accordance with another embodiment of the invention. As shown in FIG. 6, this embodiment is different from the structural configuration of the magnetic elements M (including the magnetic element M2) in FIG. 5A. More specifically, the magnetic elements M1 and M2 of this embodiment are all short magnets (the length is less than the length of the other magnetic elements M), and the magnetic elements M1 and M2 are arranged in a staggered manner. Accordingly, on two adjacent sides of the two lens driving modules, the magnetic elements M1 and M2 are arranged asymmetrically with respect to a central line C between the two adjacent sides. For example, the magnetic elements M1 and M2 do not overlap when viewed along the X-axis direction. In this embodiment, the magnetic elements M1 and M2 may have the same length.

With the above structural design shown in FIG. 6, the magnetic interference generated by the adjacent magnetic elements M1 and M2 of the two lens driving modules can also be reduced. Consequently, the magnetic interference between the two lens driving modules of the dual-lens camera system is reduced, and the weight of the dual-lens camera system is effectively reduced.

Figure 7:
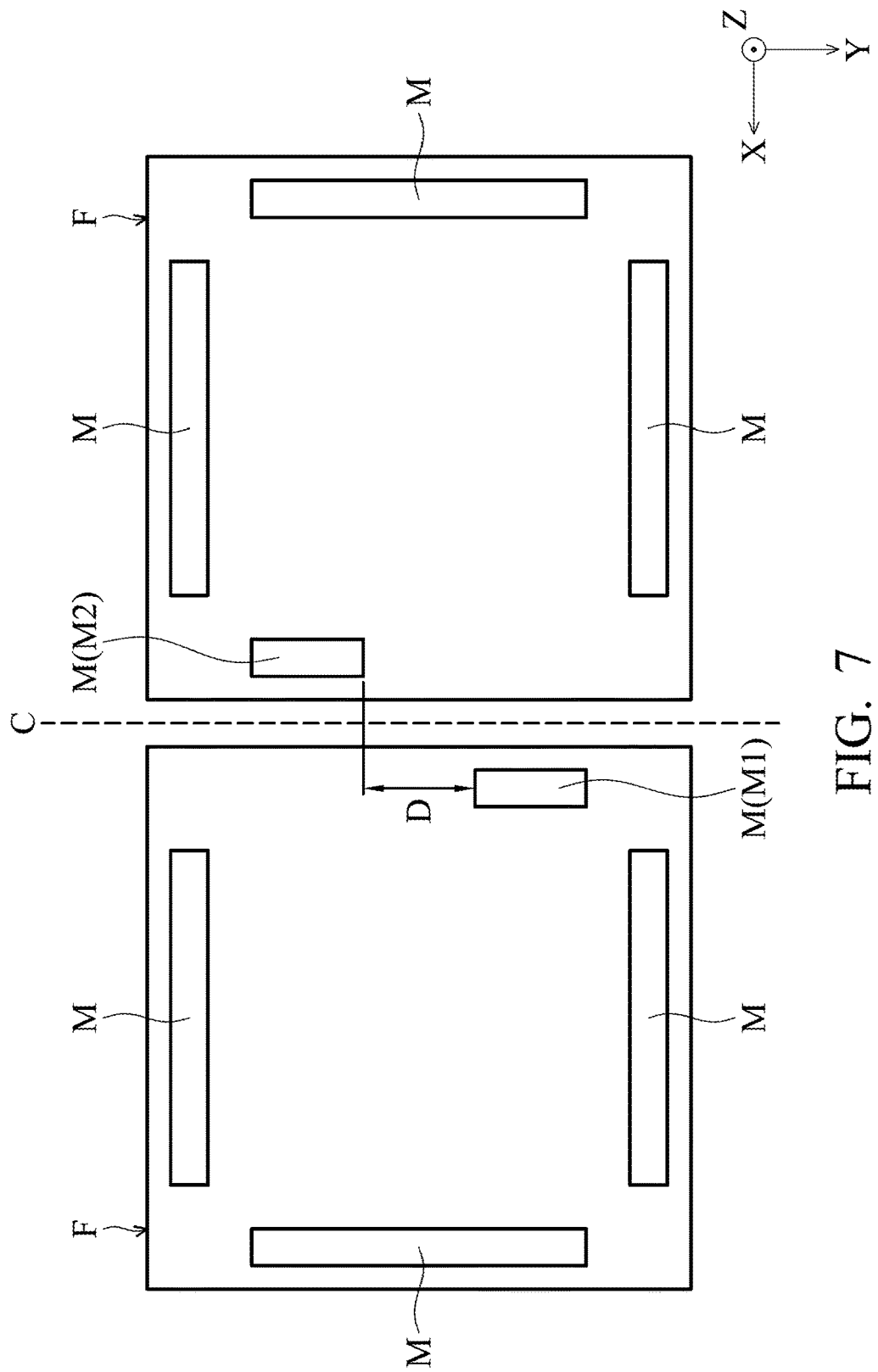
FIG. 7 is a schematic plane view showing the configuration of the magnetic elements of two lens driving modules in accordance with another embodiment of the invention.

FIG. 7 is a schematic plane view showing the configuration of the magnetic elements of two lens driving modules in accordance with another embodiment of the invention. As shown in FIG. 7, this embodiment differs from the embodiment of FIG. 6 in that the number of the adjacent magnetic elements M1 and M2 of the two lens driving modules are both only one, and the magnetic elements M1 and M2 are arranged in a staggered manner. Accordingly, on two adjacent sides of the two lens driving modules, the magnetic elements M1 and M2 are arranged asymmetrically with respect to a central line C between the two adjacent sides. Moreover, a larger distance D between the magnetic elements M1 and M2 in the Y-axis direction also reduces the magnetic interference therebetween.

Although the number of the magnetic elements M1 or M2 is one or two in the above embodiments, it may also be three or more. Alternatively, the number of the adjacent magnetic elements M1 and M2 of the two lens driving modules may both be plural. In particular, the magnetic elements M1 and M2 may be staggered or arranged asymmetrically to reduce magnetic interference therebetween.

Figure 8:
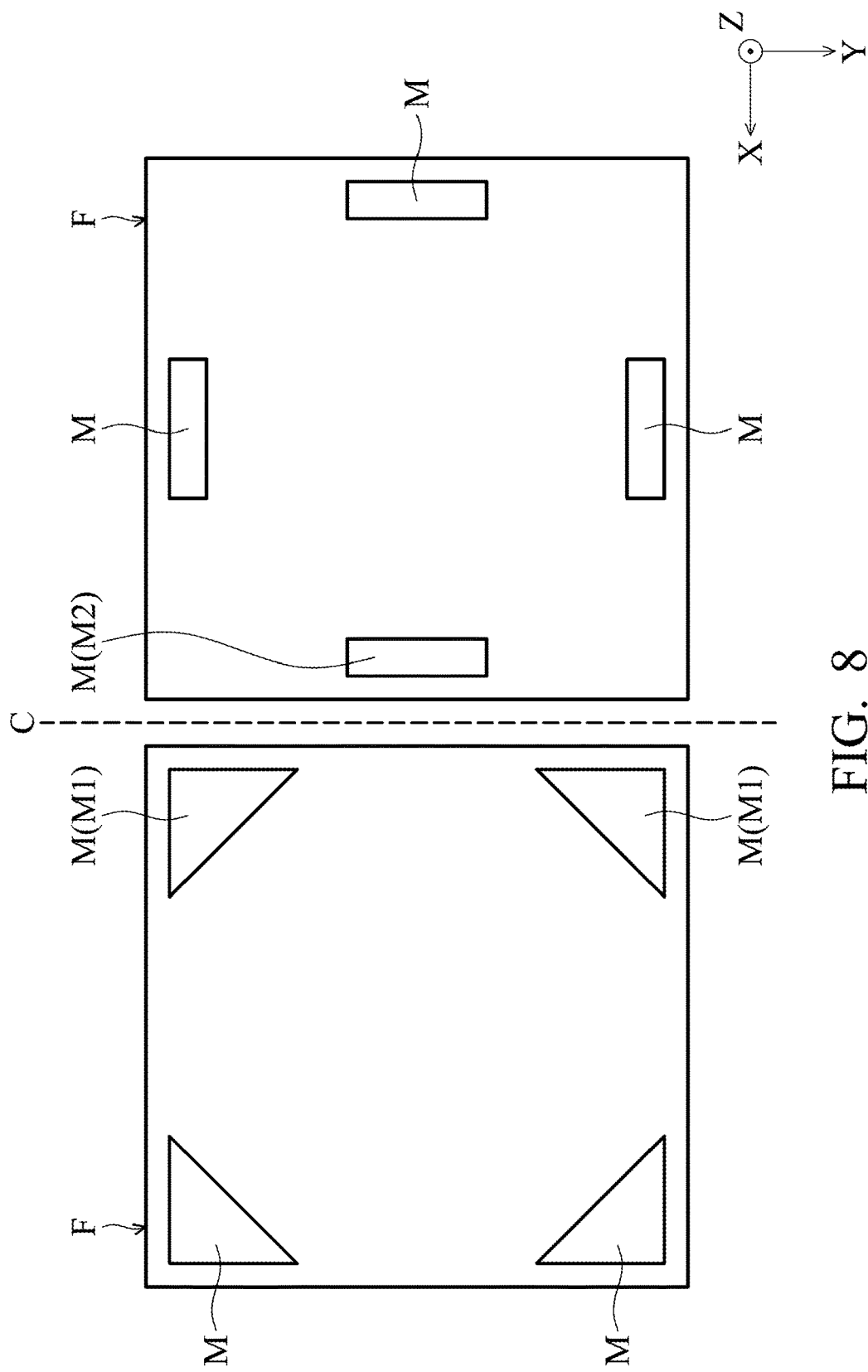
FIG. 8 is a schematic plane view showing the configuration of the magnetic elements of two lens driving modules in accordance with another embodiment of the invention.

FIG. 8 is a schematic plane view showing the configuration of the magnetic elements of two lens driving modules in accordance with another embodiment of the invention. In this embodiment, the magnetic elements M (including a magnetic element M2) of a second lens driving module on the right side of FIG. 8 all have a long strip structure, and the magnetic elements M (including two magnetic element M1) of a first lens driving module on the left side of FIG. 8 all have a triangular structure.

Moreover, the magnetic elements M (including the magnetic elements M1) of the first lens driving module are respectively located at four corners of the housing F, and the magnetic elements M (including the magnetic element M2) of the second lens driving module are respectively located on four sides of the housing F. Accordingly, the adjacent magnetic elements M1 and M2 of the two lens driving modules are substantially arranged in a staggered manner. In other words, on two adjacent sides of the two lens driving modules, the magnetic elements M1 and M2 are arranged asymmetrically with respect to a central line C between the two adjacent sides. In this embodiment, the magnetic elements M1 and M2 do not overlap when viewed along the X-axis direction.

With the above structural design shown in FIG. 8, the magnetic interference generated by the adjacent magnetic elements M1 and M2 of the two lens driving modules can also be reduced. Consequently, the magnetic interference between the two lens driving modules of the dual-lens camera system is reduced.

Figure 9:
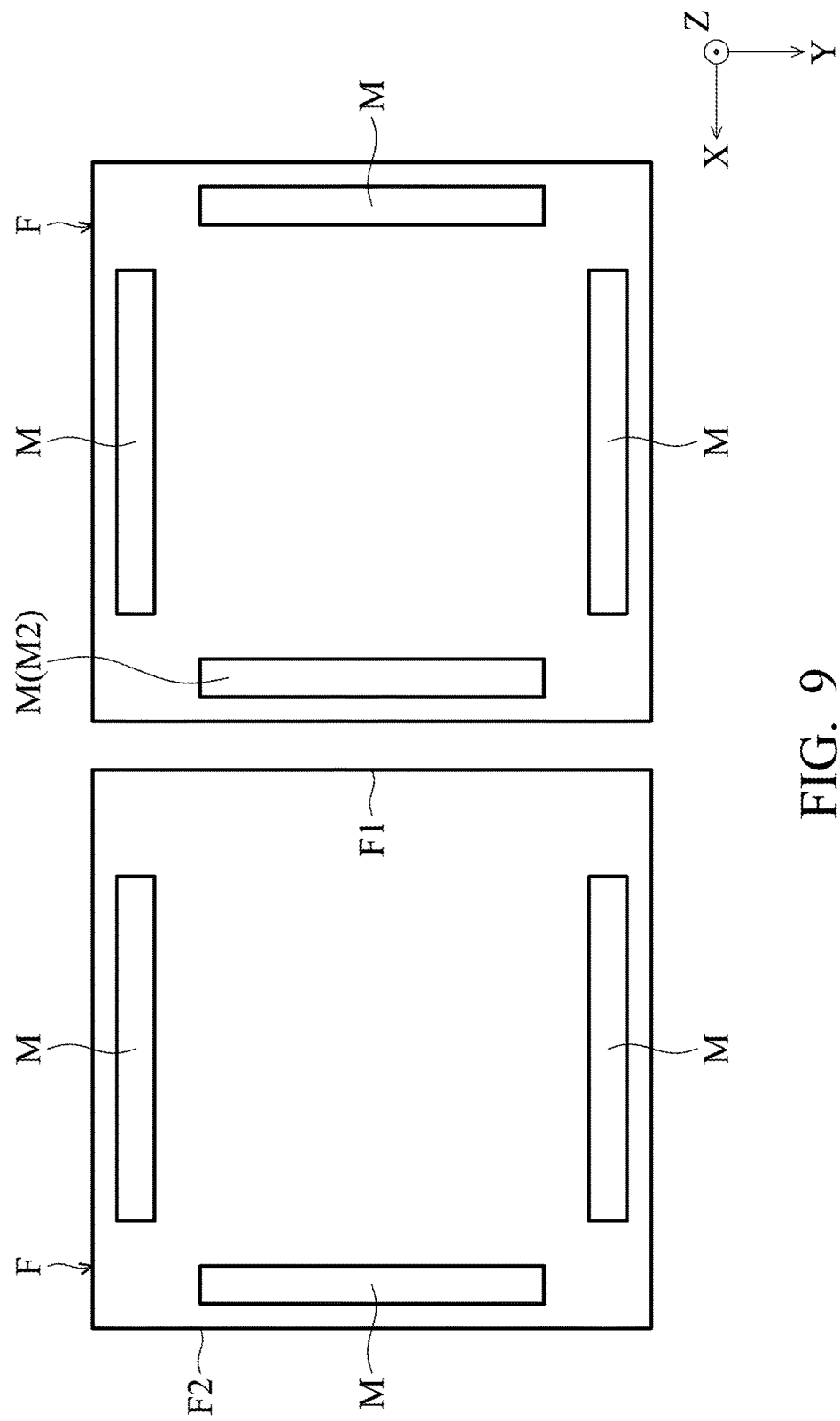
FIG. 9 is a schematic plane view showing the configuration of the magnetic elements of two lens driving modules in accordance with another embodiment of the invention.

FIG. 9 is a schematic plane view showing the configuration of the magnetic elements of two lens driving modules in accordance with another embodiment of the invention. In this embodiment, a second lens driving module on the right side of FIG. 9 has four long strip magnetic elements M (including a magnetic element M2) arranged symmetrically. On the other hand, on a first side F1 (adjacent to the second lens driving module) of a first lens driving module on the left side of FIG. 9, no magnetic element is provided to correspond to the magnetic element M2 of the second lens driving module. Thus, the magnetic interference between the two lens driving modules can be reduced.

Figure 10:
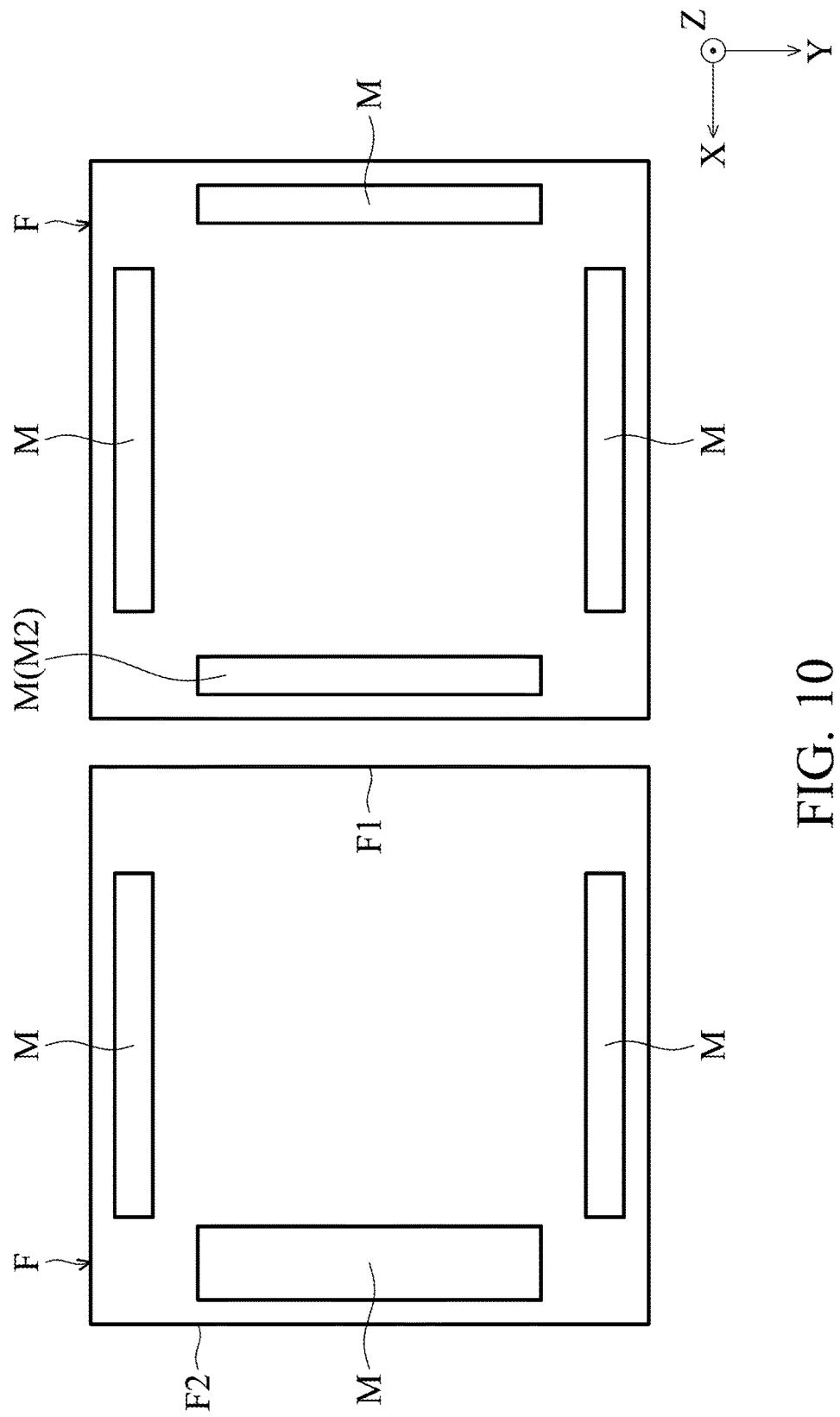
FIG. 10 is a schematic plane view showing the configuration of the magnetic elements of two lens driving modules in accordance with another embodiment of the invention.

However, in order to overcome the problem that the driving force is insufficient due to the reduction of the magnetic element M in the first lens driving module, the width, the volume, or the weight of the magnetic element M provided on a second side F2 of the first lens driving module may be increased, as shown in FIG. 10, to enhance the overall driving force of the first lens driving module. The magnetic element M disposed on the second side F2 may be a magnet, and the second side F2 is opposite the first side F1.

Figure 11:
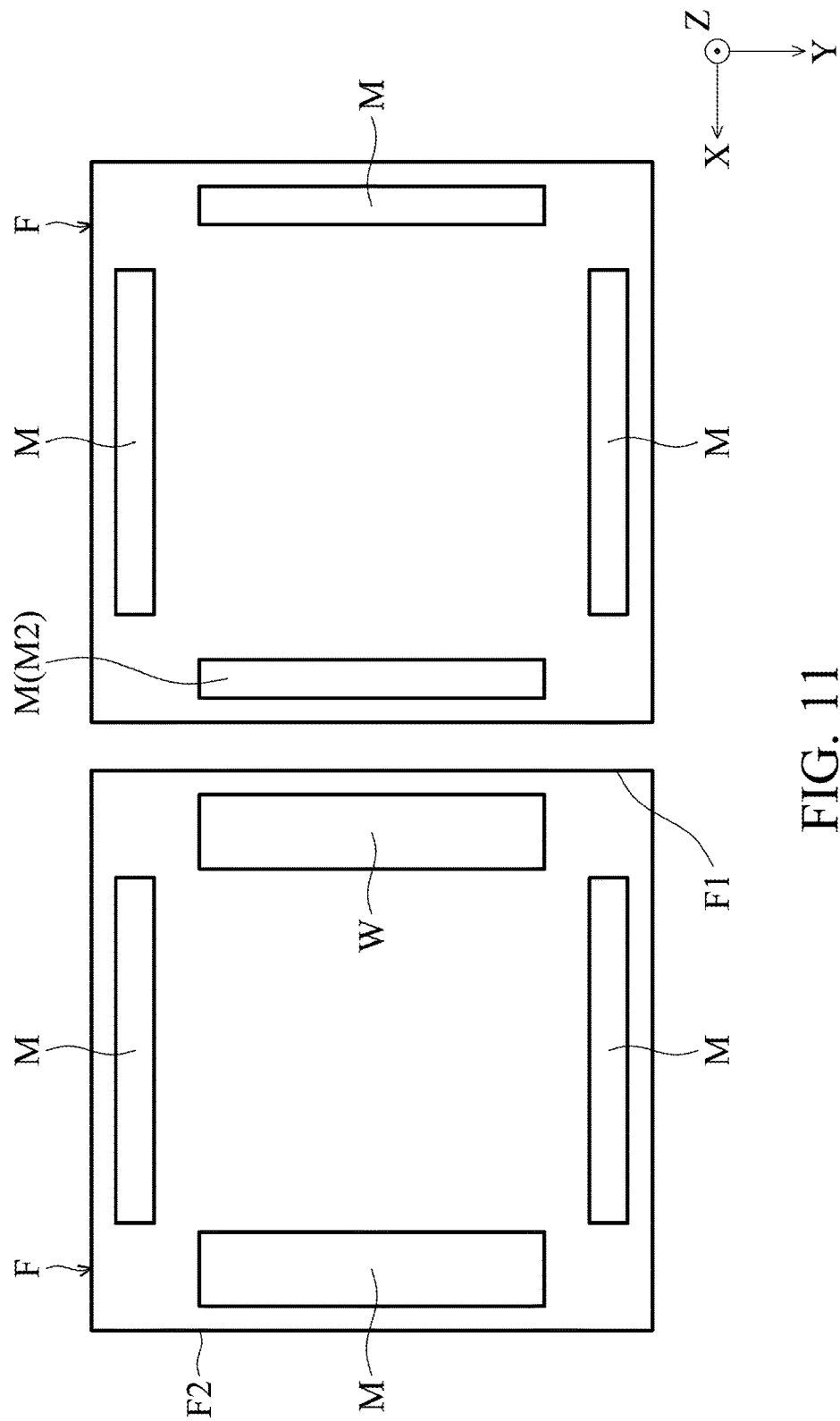
FIG. 11 is a schematic plane view showing the configuration of the magnetic elements of two lens driving modules in accordance with another embodiment of the invention.

In addition, in order to avoid the poor stability of the first lens driving module on the left side of FIG. 10 caused by the weight imbalance, a non-magnetic conductive weight balancer W (see FIG. 11) may also be provided on the first side F1 of the first lens driving module to correspond to the magnetic element M on the second side F2, for maintaining the weight balance of the first lens driving module.

Figure 12:
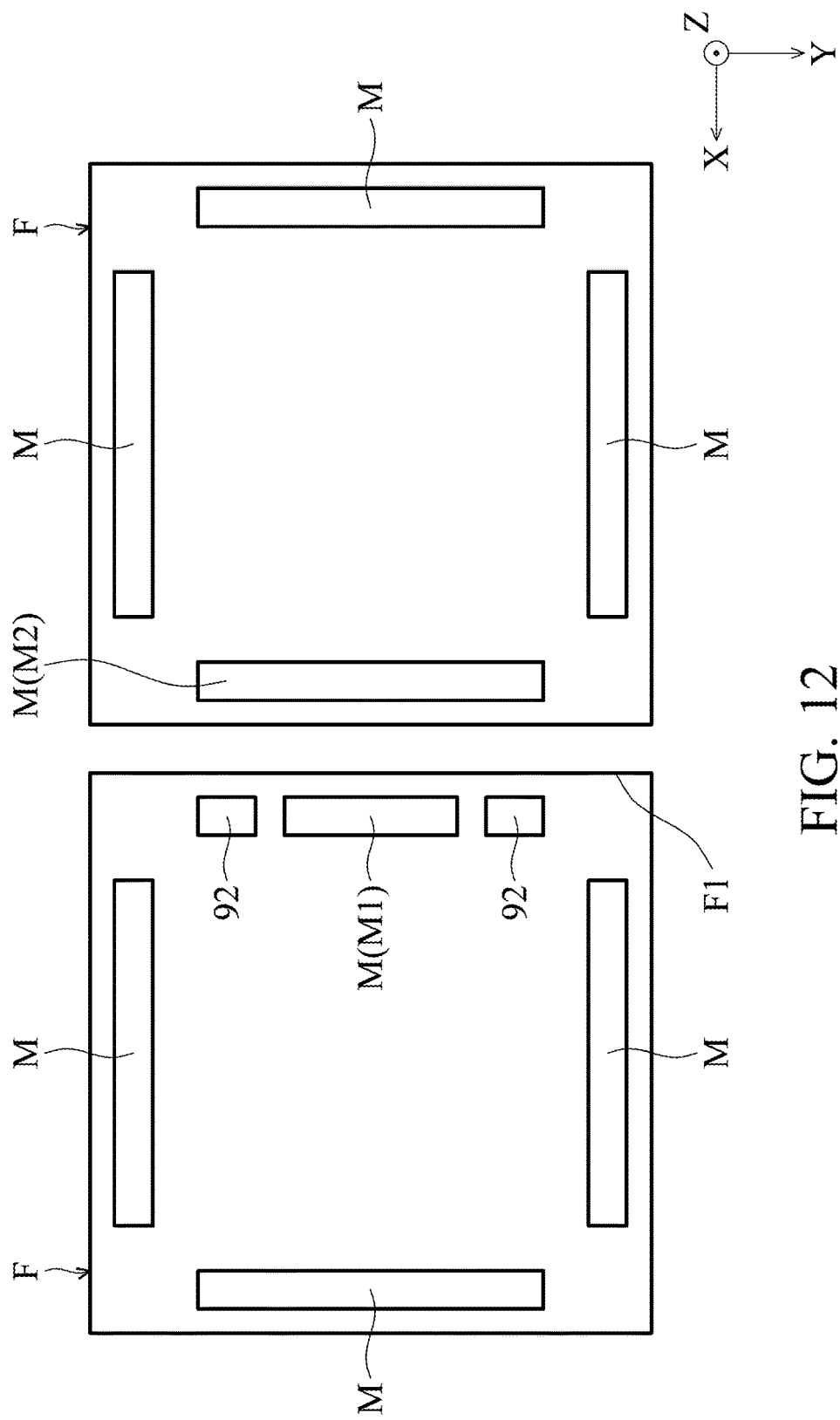
FIG. 12 is a schematic plane view showing the configuration of the magnetic elements of two lens driving modules in accordance with another embodiment of the invention.

FIG. 12 is a schematic plane view showing the configuration of the magnetic elements of two lens driving modules in accordance with another embodiment of the invention. In this embodiment, a magnetic element M1 (such as a magnet) and two magnetic field sensing elements 92 as described above are provided on a first side F1 of the first lens driving module on the left side of FIG. 12, and the magnetic element M1 is adjacent to a magnetic element M2 of a second lens driving module on the right side of FIG. 12. In particular, the length of the magnetic element M1 is less than that of the magnetic element M2, and the magnetic element M1 is located between the two magnetic field sensing elements 92. By reducing the length of the magnetic element M1 in this embodiment, the magnetic interference between the magnetic elements M1 and M2 is also reduced. In addition, the two magnetic field sensing elements 92 may be placed in the remaining space on the upper or lower side of the magnetic element M1, so that the purpose of saving space and device miniaturization is further achieved.

In this embodiment, the magnetic field sensing elements 92 can be used to detect the magnetic field variation of the magnetic element M1, thereby determining the position offset amount of the magnetic element M1 and the frame 50 with respect to the base 20 (FIGS. 2 and 3). Moreover, the magnetic element M1 and the magnetic field sensing elements 92 do not overlap when viewed along the Z-axis (i.e. the optical axis O in FIG. 2) direction. However, only a magnetic field sensing element 92 and a magnetic element M1 may be provided on the first side F1 in some embodiments. In this way, the position offset amount of the magnetic element M1 and the frame 50 with respect to the base 20 can also be learned by the magnetic field sensing element 92, to achieve the effect of saving space and device miniaturization.

Figure 13:
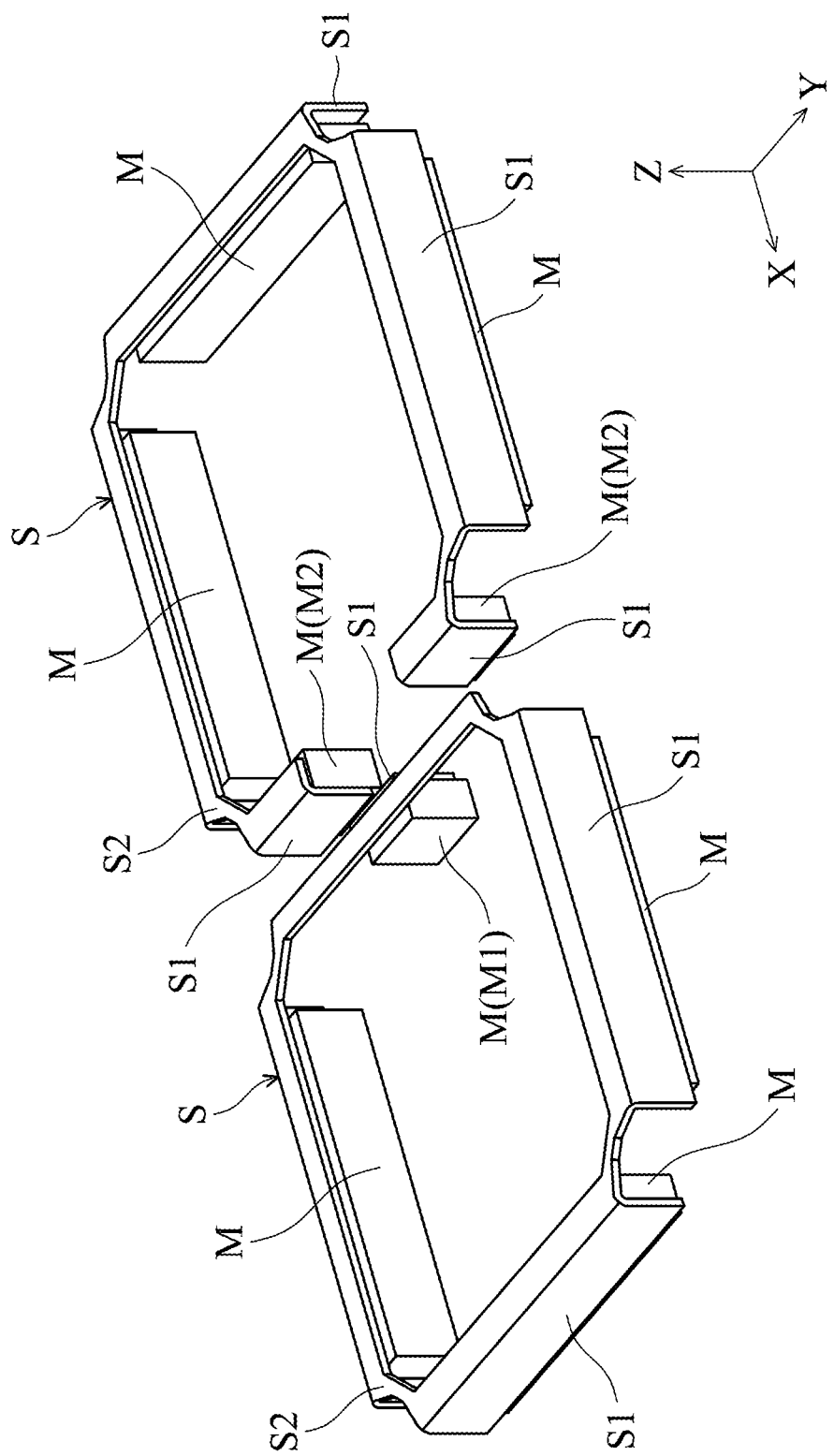
FIG. 13 is a schematic view showing that the outsides of the magnetic elements of two lens driving modules are provided with shielding members in accordance with another embodiment of the invention.

FIG. 13 is a schematic view showing that the outsides of the magnetic elements of two lens driving modules are provided with shielding members in accordance with another embodiment of the invention. As shown in FIG. 13, the outsides of the magnetic elements M (including the magnetic elements M1 and M2) mounted on the movable parts (i.e. the frames 50 in FIGS. 2 and 3) of the two lens driving modules are respectively provided with a shielding member S (this embodiment includes two shielding members S). Each of the shielding members S includes multiple shielding portions 51 and a frame portion S2 connecting the shielding portions 51. The shielding member S may be affixed to the frame 50 or integrally formed with the frame 50. It should be realized that the shielding members S comprise a magnetic conductive material (such as nickel-iron alloy), so that the shielding members S can guide and concentrate the magnetic lines generated by the magnetic elements M, thereby reducing the magnetic interference between the adjacent magnetic elements M1 and M2 of the two lens driving modules of the dual-lens camera system.

Figure 14:
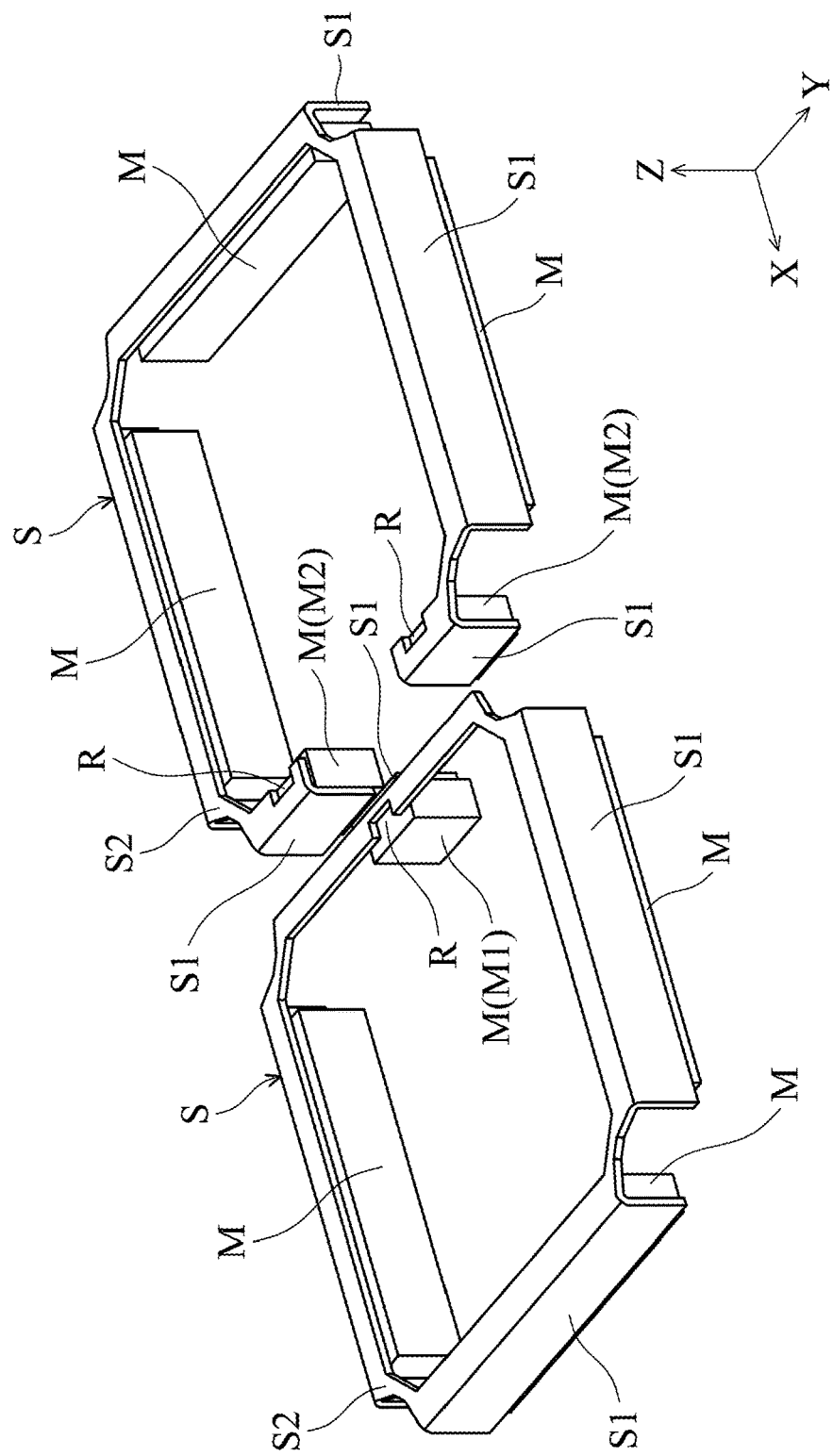
FIG. 14 is a schematic view showing that each of the shielding members has at least one recess in accordance with another embodiment of the invention.

Referring to FIG. 14, in some embodiments, the frame portions S2 of the shielding members S each further has at least one recess R that is formed on the top surface of the magnetic element M1 or M2 and corresponding to the lens holder 30 (FIGS. 2 and 3) of the first or second lens driving module. When the lens holder 30 moves downward with respect to the frame 50 along the Z-axis direction due to focusing or vibration, (the top surface of) the lens holder 30 can enter the recess(s) R and abut the top surface (stop surface) of the magnetic element M1 or M2, thereby preventing the lens holder 30 from impacting the shielding member S and restricting the lens holder 30 on a limit position. As a result, not only the moving distance of the lens holder 30 in the Z-axis direction is increased, but the thickness of the first and second lens driving modules in the Z-axis direction can be effectively reduced and thus the purpose of device miniaturization is achieved.

Although the structural configuration of the magnetic elements M1 and M2 shown in FIGS. 13 and 14 is similar to that of the embodiment in FIG. 6A, the magnetic elements M1 and M2 may also be configured as show in FIGS. 5A and 7-12 or arranged in other optional configurations which can reduce the magnetic interference between the two lens driving modules, as long as the shielding portion 51 of the shielding member S can cover the outside of the magnetic element M1 or M2. On the other hand, the magnetic pole direction (N-S) of the magnetic elements M1 and M2 in the foregoing embodiments may be parallel to the Z-axis direction (as shown in FIG. 5B), or the magnetic elements M1 and M2 may also be multipole magnets, so that the magnetic interference between the magnetic elements M1 and M2 can be reduced accordingly.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A dual-lens camera system, comprising a first lens driving module and a second lens driving module, the first and second lens driving modules being arranged in a long-axis direction, wherein
the first lens driving module comprising:
   a first lens holder configured to receive a first lens;
   at least one first magnetic element; and
   at least one first driving coil configured to act with the first magnetic element to generate an electromagnetic force to move the first lens holder and the first lens along a first direction; and
the second lens driving module comprising:
   a second lens holder configured to receive a second lens;
   at least one second magnetic element; and
   at least one second driving coil configured to act with the second magnetic element to generate an electromagnetic force to move the second lens holder and the second lens along the first direction;
wherein a first side of the first lens driving module and a second side of the second lens driving module are parallel to and adjacent to each other, and the at least one second magnetic element is partially disposed on the second side, the first magnetic element disposed on a third side different from the first side in the first lens driving module having strip structure extending along the long-axis direction, and the first magnetic element is not disposed on the first side.

2. The dual-lens camera system as claimed in claim 1, wherein the first lens driving module further comprises a first housing, the second lens driving module further comprises a second housing, and parts of the first and second housings are disposed between the first and second magnetic elements.

3. The dual-lens camera system as claimed in claim 1, wherein the second lens driving module further comprising:
   a frame, wherein the second lens holder is movably connected to the frame; and
   a base, wherein the frame is movably connected to the base, and the second magnetic element is disposed on the frame.

4. The dual-lens camera system as claimed in claim 3, wherein the second lens driving module further comprises an elastic element elastically connecting the frame and the second lens holder, and the elastic element and the frame are partially overlapped when viewed along a direction perpendicular to an optical axis of the second lens.

5. The dual-lens camera system as claimed in claim 4, wherein the second lens driving module further comprises a plurality of second magnetic elements disposed around the second lens holder.

6. The dual-lens camera system as claimed in claim 5, wherein the second lens driving module has a rectangular shape and the second magnetic elements are respectively disposed at corners of the second lens driving module, when viewed along a direction of the optical axis of the second lens.

7. The dual-lens camera system as claimed in claim 6, wherein each of the second magnetic elements disposed at the corners of the second lens driving module have a triangular structure.

8. The dual-lens camera system as claimed in claim 1, wherein the first magnetic element disposed on a fourth side opposite to the third side in the first lens driving module having strip structure extending along the long-axis direction.

9. The dual-lens camera system as claimed in claim 1, wherein the second magnetic element disposed on the second side having strip structure extending along a direction different from the long-axis direction.

10. The dual-lens camera system as claimed in claim 9, wherein a side opposite to the first side in the first lens driving module is provided with the first magnetic element, and a weight balancer is disposed on the first side for maintaining the weight balance of the first lens driving module.

11. The dual-lens camera system as claimed in claim 1, wherein the first lens driving module further comprises a magnet disposed on a second side opposite the first side, and the width of the magnet is greater than the width of the magnetic element of the first lens driving module.

12. The dual-lens camera system as claimed in claim 1, wherein the magnetic pole direction of the magnetic element of the first lens driving module is parallel to the optical axis of the lens.

13. The dual-lens camera system as claimed in claim 1, further comprising a position sensing assembly disposed on the first side or the second side.

14. The dual-lens camera system as claimed in claim 13, wherein the position sensing assembly comprises a reference magnetic element and a magnetic field sensing element.

15. The dual-lens camera system as claimed in claim 1, wherein the first lens driving module further comprises a magnet and a magnetic field sensing element, the magnet and the magnetic field sensing element are disposed on a first side of the first lens driving module adjacent to the second lens driving module, and the magnetic field sensing element learns the position offset amount of the magnet by detecting the magnetic field variation of the magnet, and the magnet and the magnetic field sensing element do not overlap when viewed along the optical axis.

16. The dual-lens camera system as claimed in claim 15, wherein the first lens driving module further comprises two magnetic field sensing elements, the magnet and the magnetic field sensing elements are disposed on the first side, and the magnet is located between the magnetic field sensing elements.

17. The dual-lens camera system as claimed in claim 1, wherein the first lens driving module further comprises a shielding member having a portion disposed between the first and second magnetic elements for reducing the magnetic interference between the first and second lens driving modules.

18. The dual-lens camera system as claimed in claim 17, wherein the shielding member forms at least one recess corresponding to a top surface of the first lens holder of the first lens driving module for preventing the first lens holder from impacting the shielding member.

19. The dual-lens camera system as claimed in claim 1, wherein the magnetic elements comprise at least one multipole magnet.

20. The dual-lens camera system as claimed in claim 19, wherein the first magnetic element or the second magnetic element is the multipole magnet.

* * * * *